US005089198A

United States Patent [19]

Leach, deceased

[11] Patent Number: 5,089,198

[45] Date of Patent: Feb. 18, 1992

[54] METHOD FOR CURING CONCRETE ARTICLES

[75] Inventor: Christopher B. Leach, deceased, late of Lowell, Mich., by Audrey A. Leach, legal representative

[73] Assignee: CAM Sales, Inc., Ludington, Mich.

[21] Appl. No.: 312,118

[22] Filed: Feb. 17, 1989

[51] Int. Cl.[5] ........................ B29C 71/02; C04B 40/02

[52] U.S. Cl. .......................................... 264/82; 34/26; 34/30; 264/234; 264/345; 264/333; 264/DIG. 43

[58] Field of Search ........ 264/82, DIG. 43, DIG. 59, 264/228, 86, 333, 71, 345, 234; 34/26, 30

[56] References Cited

U.S. PATENT DOCUMENTS

| | | | |
|---|---|---|---|
| Re. 7,084 | 4/1876 | Rowland . | |
| 123,723 | 2/1972 | Schillinger . | |
| 128,980 | 7/1872 | Rowland . | |
| 137,322 | 4/1873 | Rowland . | |
| 200,064 | 2/1878 | Johnson . | |
| 683,337 | 9/1901 | Schultness | 264/345 |
| 809,053 | 1/1906 | Gordon . | |
| 1,348,775 | 8/1920 | Bellonby | 264/82 |
| 1,379,204 | 5/1921 | Norton | 264/82 |
| 2,622,303 | 12/1952 | Wilson . | |
| 3,231,657 | 1/1966 | Kalousek | 264/345 |
| 3,238,279 | 3/1966 | Tarlton et al. . | |
| 3,275,724 | 9/1966 | Klingel | 264/345 |
| 3,327,032 | 6/1967 | Adams | 264/345 |
| 3,427,009 | 2/1969 | Shute . | |
| 3,447,937 | 6/1969 | Hersey et al. | 264/345 |
| 3,492,385 | 1/1970 | Simunic | 264/345 |
| 3,499,069 | 3/1970 | Seigle | 264/234 |
| 3,523,997 | 8/1970 | Hennig | 264/345 |
| 3,535,407 | 10/1970 | Pike | 264/824 |
| 3,806,571 | 4/1974 | Rönnmark et al. . | |
| 3,957,937 | 5/1976 | Lovell . | |
| 4,042,659 | 8/1977 | Botting et al. | 264/71 |
| 4,069,283 | 1/1978 | Rauchfuss . | |
| 4,099,337 | 7/1978 | Wauhop, Jr. . | |
| 4,108,933 | 8/1978 | Göransson et al. . | |
| 4,244,904 | 1/1981 | Drain . | |
| 4,337,033 | 6/1982 | Drain . | |
| 4,394,335 | 7/1983 | Roth et al. | 264/82 |
| 4,427,610 | 1/1984 | Murray . | |
| 4,436,498 | 3/1984 | Murray . | |
| 4,531,304 | 7/1985 | Wauhop, Jr. et al. | 264/82 X |
| 4,599,211 | 7/1986 | Wise et al. . | |
| 4,655,979 | 4/1987 | Nakano et al. | 264/DIG. 54 X |
| 4,772,439 | 9/1988 | Trevino-Gonzalez | 264/40.1 X |

FOREIGN PATENT DOCUMENTS

| | | | |
|---|---|---|---|
| 1011608 | 4/1983 | U.S.S.R. | 264/345 |
| 1143736 | 3/1985 | U.S.S.R. | 264/345 |

*Primary Examiner*—Jan H. Silbaugh
*Assistant Examiner*—Karen Aftergut
*Attorney, Agent, or Firm*—Waters & Morse

[57] ABSTRACT

A process for fast and uniform hydration of uncured concrete products includes supplying pressurized and superheated water to a manifold supporting a plurality of small diameter orifice nozzles housed inside a curing room which also houses the products during curing. The superheated water is ejected by the nozzles in very fine particulate form, creating a mist or suspension of water particles that surrounds the products and creates the desired high humidity, moderately high temperature environment for promoting hydration. The water preferably is softened before it is pressurized and supplied to the nozzles. Under favorable conditions, the hydration reaction supplies sufficient heat to maintain a desired temperature within the curing room. The water is heated before it is supplied to the nozzles after pressurization.

18 Claims, 1 Drawing Sheet

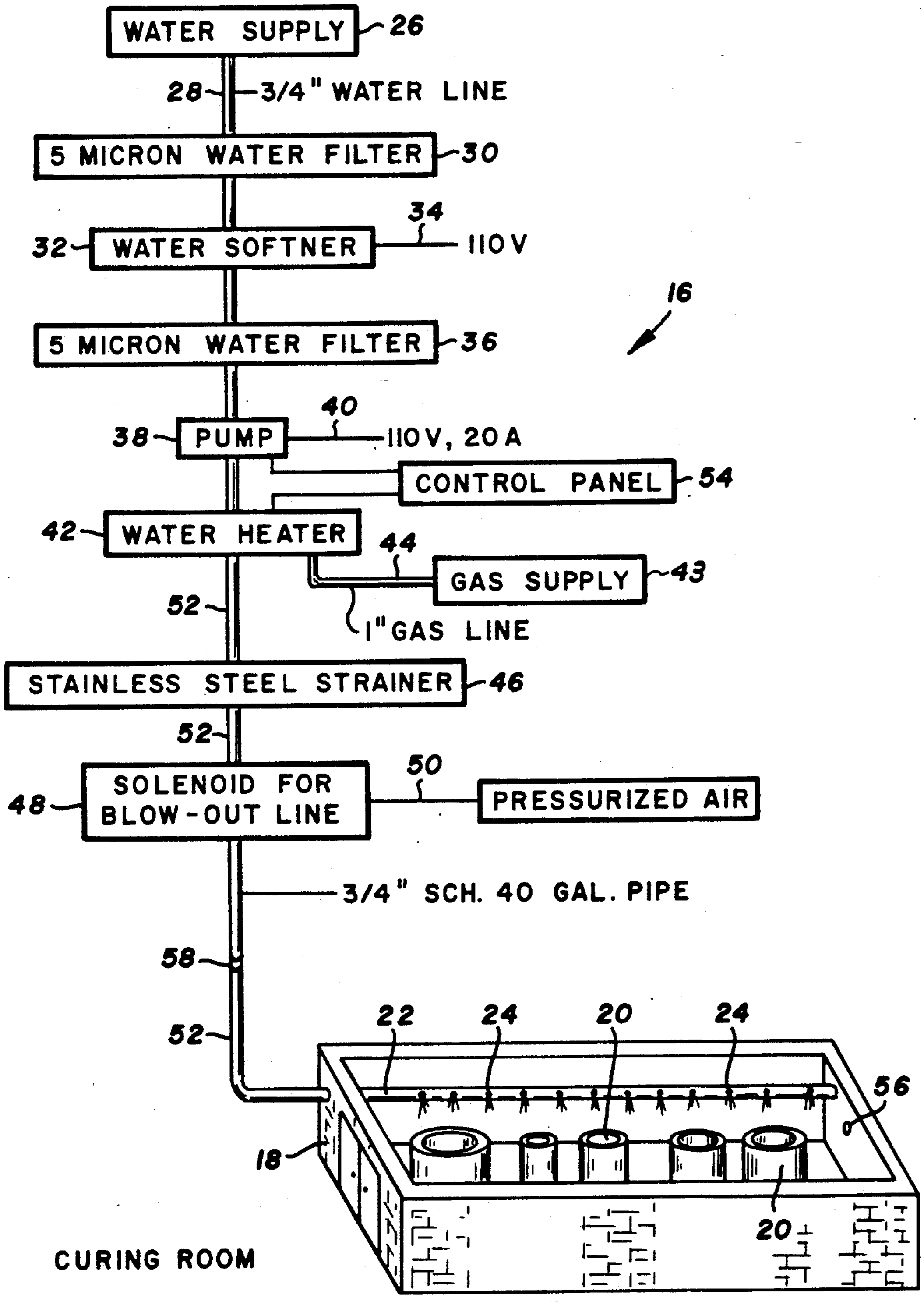
WATER SUPPLY
26
28
3/4" WATER LINE
5 MICRON WATER FILTER
30
34
32
WATER SOFTNER
110V
16
5 MICRON WATER FILTER
36
40
38
PUMP
110V, 20A
CONTROL PANEL
54
42
WATER HEATER
44
GAS SUPPLY
43
52
1" GAS LINE
STAINLESS STEEL STRAINER
46
52
50
SOLENOID FOR BLOW-OUT LINE
48
PRESSURIZED AIR
3/4" SCH. 40 GAL. PIPE
58
52
22
24
20
24
56
18
20
CURING ROOM

METHOD FOR CURING CONCRETE ARTICLES

BACKGROUND OF THE INVENTION

This invention relates to the curing of concrete products, and more particularly to promoting hydration of such products in temperature-controlled, high humidity environments.

Over the years, a number of approaches have been developed for promoting or advancing the curing of concrete products such as piping, slabs, blocks and the like. One common method of curing is to confine concrete products in a totally enclosed room or kiln, and to inject low pressure steam into the kiln from a boiler or steam generator. U. S. Pat. No. 2,622,303 (Wilson) discloses a method for molding double-walled hollow concrete blocks in which nozzles at opposite ends of a mold inject steam into the mold. A multi-stage process is disclosed in U. S. Pat. No. 3,238,279 (Tarlton), including a stage of applying steam alone into a kiln, followed by a mixture of steam and carbon dioxide, and finally a dry air stage.

It also is known to subject the concrete to steam at high pressure For example, U. S. Pat. No. 3,957,937 (Lovell) discloses a concrete curing method including subjecting products to superheated steam and carbon dioxide, followed by applications of steam alone, ambient air and cooling air.

Yet another approach involves providing a large trough or body of water at or near the floor of the curing enclosure. In a kiln for curing concrete slabs, U. S. Pat. No. 4,099,337 (Wauhop) shows water being sprayed into a water bath from above, but also from a position below the slabs. The spray is intended to increase evaporation from the bath. U. S. Pat. No. 4,337,033 (Drain) shows a curing system in which the atmosphere inside of the kiln is withdrawn, mixed with a stream of heated water, then injected into a body of water inside the kiln.

All of the above-described methods have a similar objective, namely to supply moisture and raise the ambient temperature of a curing enclosure sufficiently to promote the hydration process. Hydration is an exothermic chemical reaction of cement and water which hardens or solidifies the concrete product during the curing cycle, with the amount of heat generated depending upon the percentage of cement in the product. While the above approaches promote hydration for more rapid curing, they fail to provide uniform and consistent curing necessary for optimum compressive strength. Moreover, systems utilizing steam generators or boilers are expensive to acquire and operate, and, due to the high temperatures involved, subject concrete articles to crusting, baking and hot spotting problems. Bath or trough systems depend upon water vapor and require constant recirculation and heating of the water, and the attendant expensive equipment.

Therefore, it is an object of the present invention to provide a system for curing concrete products at low temperatures compared to steam-based systems and without the use of steam or carbon dioxide.

Another object of the invention is to provide a process for the rapid and uniform curing of concrete articles.

Another object is to provide a low cost system for curing concrete articles in a moderately high temperature atmosphere at or near 100% relative humidity to promote uniform hydration throughout the articles.

Yet another object is to provide a curing process in which, given favorable ambient conditions, the majority of the curing process can be accomplished without providing auxiliary heat.

SUMMARY OF THE INVENTION

To achieve these and other objects, there is provided a process for promoting the hydration of concrete articles including the steps of:

confining an uncured article of concrete in a curing enclosure;

providing a mist surrounding the article and inside the enclosure, with the mist consisting of water in the form of particles within a range of from about 20 microns to about 40 microns in diameter;

maintaining the mist within the enclosure, and simultaneously maintaining the temperature inside the enclosure in a range of from about 80° F. to about 130° F., for a predetermined period of time.

The mist can be formed by providing water at high pressure, e.g., 200–400 pounds per square inch, to a plurality of small diameter orifice nozzles inside of the curing enclosure. The water is atomized as it is ejected from the nozzles, thus to form the mist. For controlling the temperature within the curing enclosure, the pressurized water can be superheated, e.g. to a temperature of 270° F.-300° F., before it is provided to the nozzles. Superheating also enhances the tendency of the particles to form a suspension or "float", such that the mist particles eventually displace cooler air within the chamber and form a high humidity environment at a temperature sufficiently high to facilitate hydration.

At the same time, the temperature in the chamber is kept low, i.e. well below the 150° F. typical in curing operations utilizing steam. This enhances even, uniform curing throughout the products, as well as avoiding crusting, baking and similar problems associated with higher temperature curing. A further advantage of the lower temperature curing, in this case typically about 110°, is that if ambient temperatures are at least 80°, the hydration reaction can supply the necessary heat to maintain the desired curing chamber temperature. The practical effect is to eliminate the need for a water heater or other auxiliary source of heat for all except the initial stages of the curing cycle.

A further advantageous step in the process is to soften the water prior to pressurization and heating. This removes potentially corrosive minerals for longer life and more efficient operation.

A concrete curing system in accordance with the present invention can be provided at a substantially reduced cost compared to conventional systems, as it requires no steam generator or boiler, but rather a water softener, a positive displacement pump and a water heater, all of which are commercially available and comparatively inexpensive. Further, all of these elements can be located outside of the curing room and thus not be subject to the high humidity and potentially corrosive atmosphere within the enclosure. Operating costs, as well, are substantially lower as the atomized or particle form of superheated water can provide the necessary high humidity and temperature-controlled environment more efficiently than steam. Also, given the lower typical curing temperature, the water heating equipment can be operated intermittently, and in some cases discontinued entirely for a major portion of the curing cycle.

IN THE DRAWING

For a further appreciation of the above and other features and advantages, reference is made to the drawing figure schematically illustrating a concrete curing system constructed in accordance with the present invention.

DETAILED DESCRIPTION OF THE PREFERRED EMBODIMENT

Turning now to the drawings, there is shown a concrete curing system 16 including a generally fluid-tight room or enclosure 18 of an appropriate size to house a group of concrete piping sections 20 ready for hydration or curing, a horizontal length of piping or manifold 22 supporting a series of symmetrically spaced apart nozzles 24 and a water supply system for conditioning water and then supplying it to the nozzles.

The water supply system is connected to a water supply 26, which can be a well, a city water supply system, or the like. Water from supply 26 travels along piping 28 and through a 5 micron water filter 30 to a water softener 32. Water softener 32 can be a standard, commercially available water softener using standard softening salt. In the preferred embodiment, the water softener is a 45,000 grain unit and is re-charged typically on a daily basis, or after one or two curing cycles. An electrical line 34 supplies power to the water softener at, typically, 110 volts. The water is softened in order to remove minerals and prevent deposits from forming on downstream piping and equipment, particularly the water heater coil. Further, the softening promotes hydration by facilitating the ability of the water to permeate the concrete piping.

Water from softener 32 is provided through a 5 micron filter 36 to a constant velocity positive displacement pump 38. An electrical line 40 provides 20 amperes of current at 110 volts. Pump 38 provides water to a flow-through water heater 42, which heats the water with natural gas that is provided by a gas supply 43 through a line 44. Heated water proceeds to a stainless steel strainer 46 which can be of a size ranging from 50 mesh (openings typically 0.011 inches) to 400 mesh (0.0015 inch openings), for a final straining or cleaning of the water, whereupon it is provided at elevated temperature and pressure to manifold 22 and nozzles 24. Between the strainer and manifold, a solenoid controlled safety release or blow-out line 48, operable through an air line 50, is provided to relieve the water pressure should it exceed a predetermined maximum limit.

Piping 52 between water heater 42 and manifold 22 is preferably a Schedule 40 wrought steel galvanized piping or equivalent. The "standard strength" rated version of this piping has a working pressure of 1078 pounds per square inch, which is about 1/10th of the burst strength for a 3/8 inch diameter piping. Preferably the piping is provided in diameters of 1/3 to 1/2 of an inch. Manifold 22 is likewise formed of Schedule 40 galvanized piping.

In the arrangement shown, curing room 18 has a length of 140 feet, a width of 11 feet and is 12 feet high. In accordance with the curing room size, twelve nozzles 24 are provided, with adjacent nozzles spaced apart from one another a distance of 10 feet and 9 inches. Each of the nozzles is a small orifice diameter type, in particular with an orifice diameter of 0.026 inches which results in a flow rate of 0.22 gallons per minute at a pressure of 200 pounds per square inch. The nozzle size as well as the number of nozzles in the arrangement can of course be selected in accordance with the number of BTU's per hour required in the curing cycle and the size of the curing room.

The nozzle size, however, must be such as to result in the water being atomized as it is ejected, to form a mist or suspension of fine particles. In particular, it has been found advantageous to provide a mist of particles having diameters in the range of from about 20 to 40 microns, and the aforementioned orifice size is well suited to this end.

Pump 38, water heater 42 and pressure release solenoid 48 are operated through a control panel 54 which receives input from a temperature sensing means 56 in curing room 18 and a pressure sensor 58 along piping 52.

In the typical curing cycle, cold (unheated) water from supply 26 is softened to remove iron and other unwanted mineral elements, then provided to pump 38 which raises the pressure of the water to 200 to 400 pounds per square inch. Water is provided to water heater 42 and nozzles 24 substantially at the elevated pressure, there being no intermediate back pressure valves as the back pressure is due to the nozzles. Because of the heat added by water heater 42 and the work performed on the water by the pump, the water temperature rises to between 275° F. and 300° F., and thus the water is superheated as it exits the nozzles into the curing room. An advantage of the present invention resides in the fact that superheating the water to about 300° requires little energy compared to the conventional boiler or steam generator approach, because the water does not experience a change in phase.

Strainer 46 traps any debris which might otherwise clog delivery nozzles 24. The water proceeds along piping 52 to manifold 22, and any additional manifolds provided along other walls of the curing room, depending upon the room size and the heat or BTU requirements.

The hot, pressurized water is ejected from nozzles 24 in the form of fine particles, 20 to 40 microns in diameter. Together the particles form a suspension or mist which gradually displaces cooler air within curing room 18 as it surrounds and permeates concrete piping sections 20, providing the necessary humidity and temperature to initiate hydration. In particular, the mist or suspension is at or near 100% relative humidity and hydration can begin at from 70° F. to 80° F. Once hydration begins, the reaction itself generates additional heat which contributes to reaching and maintaining a desired temperature in the curing room. In connection with the present system, the curing room temperature preferably is maintained at 110° or above, which is adequate for uniform curing throughout the concrete piping sections. At the same time, the curing room temperature is kept well below the typical steam curing temperature of 150°, e.g. below 130° F., to avoid the baking or crusting problems encountered in steam curing.

The curing cycle proceeds at temperatures within the desired range through temperature sensing means 56 and control panel 54. In particular, the operation of water heater 42 can be discontinued responsive to the sensing of a preferred maximum curing room temperature, then be initiated again in response to the sensing of a preferred minimum temperature. In fact, for a curing cycle conducted where the ambient temperature is at least 80°, the hydration reaction alone may supply sufficient heat so that water heater 42 is not operated. Even in warm climates, however, it is preferable to begin the curing cycle with the water heater operating and to continue so for the first one or two hours in order to accelerate the hydration process. After this initial phase, the water heater is not operated since no auxiliary heat is required. It should be noted that heating of the water is required, even for an ambient temperature of 80°, if the concrete parts being cured have a cement content of about 8% of less.

The typical curing process can take from about 9 to 13 hours, including an initial phase of 7 to 10 hours in which a heated mist is continually applied, and a second phase of 2 to 3 hours in which a "cold" or unheated mist is applied. At the end of the cycle, concrete piping sections 20 or other concrete products are sufficiently cured for handling, although of course the hydration process continues at a much slower rate for years after this initial curing.

One advantage of the present curing system is a substantially lower cost as compared to conventional systems based on steam. For example, the above-described cycle requires approximately 1,200 gallons of water, while a conventional steam boiler of e.g. 100 horse power consumes about 1,200 gallons of water per hour, for a consumption of 8,400 to 12,000 gallons in a typical 7 to 10 hour curing cycle. Further, the present system consumes less than 1/3 of the energy consumed in a steam generator or boiler system in a typical hour of operation. In addition to the lower cost, the cycle based on superheated water suspension can operate effectively at substantially lower temperatures, to promote more uniform curing throughout the piping for enhanced strength, while avoiding hot spots, baking and crusting.

With the exception of the manifold and nozzles, all of the water handling and supply equipment is located outside of the curing room, thus protecting it from the high humidity and moderately high temperature curing room environment. Thus, a rapid, uniform curing of concrete products is achieved at substantially reduced system acquisition and system operating cost.

What is claimed is:

1. A process for promoting the hydration of articles of concrete, including the steps of:

confining uncured concrete articles within a curing enclosure;

providing water and raising the pressure of the water to a selected pressure of from 200 to 400 pounds per square inch;

supplying the pressurized water to a plurality of nozzles inside of the curing enclosure, the nozzles producing a water spray of particles having diameters in the range of about 20 to 40 microns, the water spray producing a mist that surrounds the concrete articles in the enclosure;

maintaining the temperature inside of the curing enclosure within a range of from 80° F. to 130° F., while supplying a sufficient amount of pressurized water through the nozzles to maintain a saturated atmosphere substantially throughout the interior of the enclosure, for a predetermined period of time, the temperature inside of the enclosure being maintained by superheating the water to the temperature from about 275° F. to about 300° F. after raising the pressure of the water and before supplying the water to the nozzles, without converting the water to steam, the superheating being discontinued when not necessary to maintain the temperature inside the enclosure in the specified range.

2. The process of claim 1 including the further step of softening the water prior to raising the pressure of the water.

3. A process for humidifying an atmosphere in an enclosure wherein concrete products are cured during the humidification of the enclosure, comprising pressurizing water to a pressure of from 200 to 400 pounds per square inch, spraying the pressurized water into the enclosure through a plurality of nozzles that release the pressure on the water, thereby producing a fine water spray comprising water particles within the range of from about 20 to about 40 microns in diameter, the particles being sufficiently small that they create a mist that tends to float in the atmosphere in the enclosure, the pressurized water being heated after pressurization and before it is sprayed through the nozzles to the extent necessary to increase the temperature in the enclosure to a temperature where hydration occurs, and the concrete products are cured while avoiding baking or crusting of the concrete products, the water being superheated at the necessary temperature such that the water is maintained in its liquid state until it is sprayed into the enclosure through the nozzles for humidifying the enclosure and curing the concrete products therein.

4. A process according to claim 3, wherein the temperature in the enclosure is maintained in a range of about 80° F. to 130+ F.

5. A process for curing concrete products in an enclosure comprising the steps of:

supplying pressurized water in its liquid state to the enclosure having uncured concrete articles therein, the pressurized water being at a predetermined elevated pressure;

spraying the pressurized water into the enclosure through one or more nozzles that produce a fine spray of the pressurized water which surrounds the uncured articles in the enclosure, the orifice size of the nozzles and the pressure of the water being such as to produce the fine spray in the enclosure comprising water particles having diameters in the range of from about 20 microns to about 40 microns; and obtaining and maintaining a temperature in the enclosure of about 80° F. to 130° F. by superheating the pressurized water to at least 275° F. before spraying it into the enclosure, the temperature of the supernated water and the elevated pressure being such that the water is maintained in a liquid state until the water is sprayed into the enclosure, the elevated pressure on the water being released when it is sprayed into the enclosure, the water thus humidifying and heating the enclosure having the uncured concrete articles therein, and the superheating of the pressurized water being discontinued when it becomes unnecessary to maintain the temperature of about 80° F. to about 130° F. in the enclosure.

6. A process according to claim 5, wherein the water is pressurized to about 200 to 400 pounds per square inch.

7. A process for curing concrete products in an enclosure while avoiding the baking or crusting of the concrete products therein by maintaining a desired temperature and humidified atmosphere in the enclosure, comprising spraying pressurized water into the enclosure through a plurality of spaced nozzles thereby producing a fine mist which surrounds the concrete products in the enclosure, the nozzle orifice size and water pressure being such as to produce a spray of the fine mist comprising water particles in the range of about 20–40 microns in diameter; and maintaining a temperature of about 80° F. to about 130° F. in the enclosure during the curing of the products by superheating the pressurized water before spraying the water into the enclosure while maintaining the water under a condition of elevated pressure that prevents the water from boiling at the superheated temperature, the superheated water being sprayed into the enclosure to raise the temperature in the enclosure while humidifying the enclosure for the curing of the concrete products therein, and the superheating of the water being discontinued when unnecessary to maintain the desired temperature in the enclosure.

8. A method of curing concrete articles in enclosure while avoiding the baking or crusting of the concrete articles in the enclosure by maintaining a desired temperature in the enclosure while humidifying the enclosure, comprising:

providing a continuous supply of water;

elevating the pressure of the water with a pump;

conveying the pressurized water to one or more nozzles having spray outlets in the enclosure, the orifice size of the nozzles and the pressure on the water being such as to provide a fine spray mist of water particles in the enclosure that surrounds that concrete articles being cured in the enclosure, while providing the necessary humidity and temperature in the enclosure to initiate hydration of the concrete articles therein; and at least intermittently heating the pressurized water with a flow-through heater positioned between the pump and the nozzles to a temperature at which the pressurized water is superheated, the pressure on the superheated water preventing the water from converting into steam until it is sprayed from the nozzles into the enclosure, the heating being discontinued when it is not needed to maintain the desired temperature in the enclosure required for curing the concrete articles therein.

9. A method of curing concrete articles in an enclosure while avoiding the baking or crusting of the concrete articles by maintaining a desired temperature in the enclosure, comprising:

providing a continuous supply of water from a source to the enclosure having the concrete articles therein;

pressurizing the water to an elevated pressure;

spraying the pressurized water into the enclosure through one or more nozzles in the enclosure, the pressure on the water and the nozzle size being such that the nozzles produce a mist of fine water particles in the enclosure, which mist surrounds the concrete articles and provides the necessary humidity and temperature in the enclosure to initiate hydration of the concrete articles, wherein the water is heated after it has been pressurized but before it is sprayed into the enclosure to a temperature at which the water is superheated, the pressure on the superheated water being sufficient to prevent the water from converting into steam until it is sprayed into the enclosure, the heating being undertaken at least intermittently so as to maintain the temperature in the enclosure at the desired curing temperature while curing the concrete articles in the enclosure.

10. A process according to claim 9, wherein the water is pressurized to at least 200 pounds per square inch.

11. A process according to claim 10, wherein the water is pressurized to 200 to 400 pounds per square inch.

12. A process according to claim 9,. wherein the water is superheated to at least about 275° F.

13. A process according to claim 9, wherein the pressurized water sprayed into the enclosure comprises water particles in the range of about 20 microns to about 40 microns in diameter.

14. A process according to claim 9 where the temperature in the enclosure in maintained at about 80° F. to 130° F. by the superheating of the pressurized water when heat is required to raise the temperature in the enclosure, the superheating being discontinued when the desired temperature is achieved.

15. A process according to claim 14, wherein the temperature is maintained in the enclosure by the superheated water at a temperature of about 110° F.

16. A process according to claim 9, wherein the water is received from the water supply source, pressurized by a pump, and supplied to the nozzles in the enclosure through pressurizable piping interconnecting the pump and the nozzles, with the nozzles maintaining the pressure on the water in the piping until the water is sprayed from the nozzles into the enclosure, the water being heated by a water heater connected in the piping between the pump and nozzles, the water heater being such that the pressure on the water is maintained as the water passes through the water heater and is superheated.

17. A process according to claim 16, wherein the water is softened in a water softener before the water is provided to the pump where the pressure is elevated.

18. A process according to claim 16, wherein the temperature in the enclosure is maintained by a thermostatic switch that senses the temperature in the enclosure and controls the operation of the water heater in response thereto.

* * * * *